United States Patent
Kim et al.

(10) Patent No.: US 11,927,268 B2
(45) Date of Patent: Mar. 12, 2024

(54) RIDGE SEAL SEGMENTED VALVE

(71) Applicant: ITT Manufacturing Enterprises LLC, Wilmington, DE (US)

(72) Inventors: Steve E. Kim, Seattle, WA (US); Mustafa Donyanavard, Seattle, WA (US)

(73) Assignee: ITT MANUFACTURING ENTERPRISES LLC, Stamford, CT (US)

( * ) Notice: Subject to any disclaimer, the term of this patent is extended or adjusted under 35 U.S.C. 154(b) by 133 days.

(21) Appl. No.: 17/771,151

(22) PCT Filed: Oct. 25, 2019

(86) PCT No.: PCT/US2019/057975
§ 371 (c)(1),
(2) Date: Apr. 22, 2022

(87) PCT Pub. No.: WO2021/080594
PCT Pub. Date: Apr. 29, 2021

(65) Prior Publication Data
US 2022/0364648 A1 Nov. 17, 2022

(51) Int. Cl.
*F16K 1/226* (2006.01)
*F16K 1/20* (2006.01)
(Continued)

(52) U.S. Cl.
CPC .......... *F16K 1/2263* (2013.01); *F16K 1/2071* (2013.01); *F16K 5/0689* (2013.01); *F16K 27/0218* (2013.01)

(58) Field of Classification Search
CPC .... F16K 1/2263; F16K 1/2071; F16K 5/0689; F16K 27/0218
(Continued)

(56) References Cited

U.S. PATENT DOCUMENTS 4,165,859 A * 8/1979 Maciulaitis ............. F16K 25/00
251/173
4,206,903 A * 6/1980 Scaramucci .......... F16K 1/2261
251/315.01
(Continued)

OTHER PUBLICATIONS

International Search Report and Written Opinion for International Application No. PCT/US19/57975 dated Jan. 9, 2020, pp. 12.

*Primary Examiner* — John Bastianelli
(74) *Attorney, Agent, or Firm* — Turk IP Law, LLC

(57) ABSTRACT

Technologies are generally described for valve assemblies that include a valve body whose inner wall defines two ports and a controllable flow path that extends along the inner wall between the two ports of the valve body. Each port may be fitted with a corresponding gasket. A rotatable member disposed in the controllable flow path of the valve body may include a hemispherical-shaped body with a substantially flat disk-shaped surface portion, and a seal ridge formed about a perimeter of the substantially flat disk-shaped surface portion. During opening and closing operation, the seal ridge may be selectively engaged with either one of the gaskets reducing an initial contact surface, and thereby reducing friction between the rotatable member and the gaskets.

14 Claims, 7 Drawing Sheets

(51) Int. Cl.
  *F16K 5/06* (2006.01)
  *F16K 27/02* (2006.01)
(58) Field of Classification Search
  USPC .......................................................... 251/314
  See application file for complete search history.

(56) References Cited

U.S. PATENT DOCUMENTS

| | | | |
|---|---|---|---|
| 4,676,481 A * | 6/1987 | Hayes | F16K 1/222 |
| | | | 251/173 |
| 2013/0001455 A1 | 1/2013 | Thomas | |
| 2016/0333795 A1* | 11/2016 | Pollock | F16K 5/0689 |
| 2017/0059052 A1* | 3/2017 | Abouelleil | F16K 25/005 |

\* cited by examiner

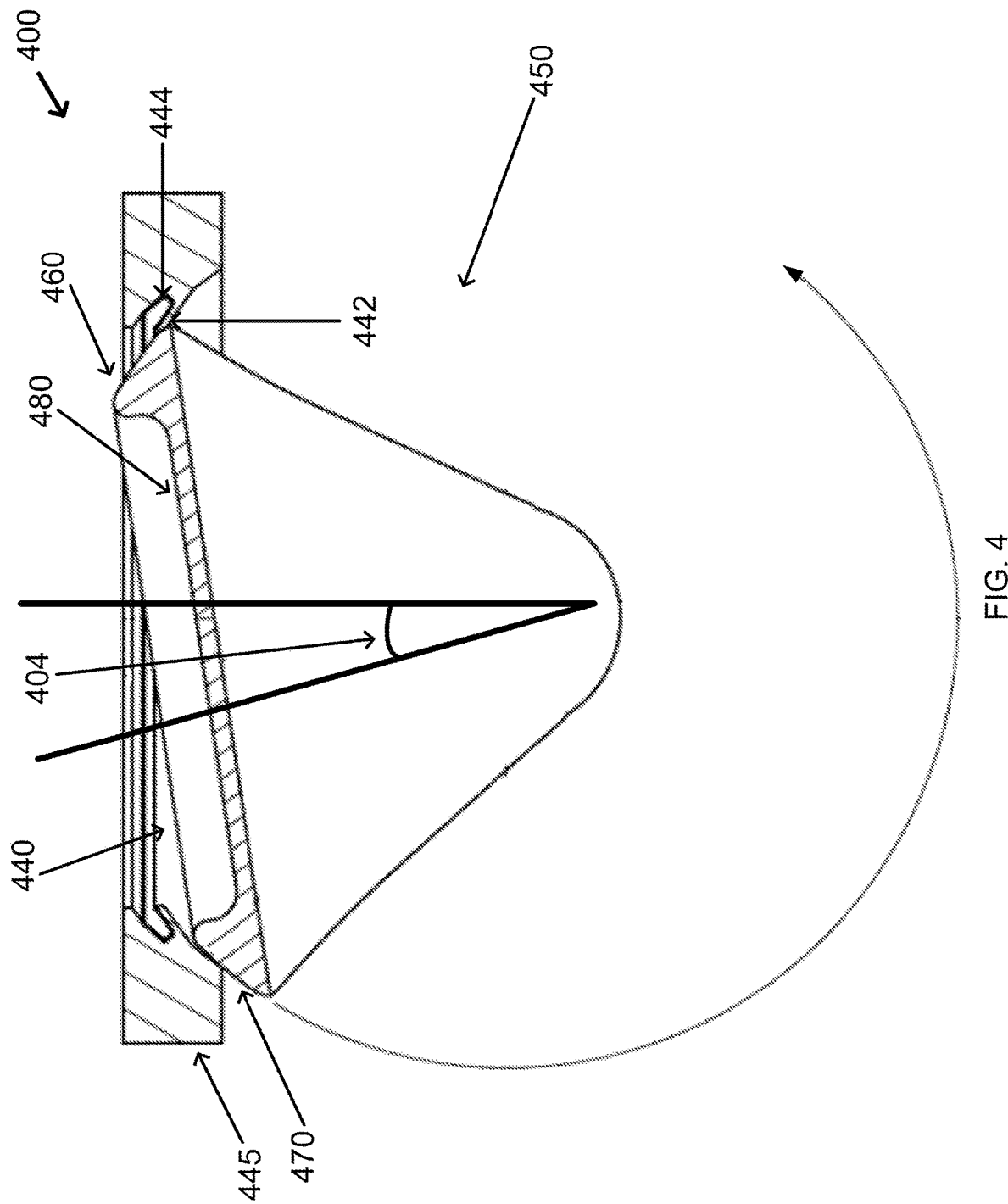

RIDGE SEAL SEGMENTED VALVE

CROSS-REFERENCE TO RELATED APPLICATIONS

The present application is a U.S. National Stage filing under 35 U.S.C. § 371 of International Application PCT/US19/57975, filed Oct. 25, 2019.

BACKGROUND

Unless otherwise indicated herein, the materials described in this section are not prior art to the claims in this application and are not admitted as prior art by inclusion in this section.

Ball valves used in fluid and gas flow applications may comprise a valve body having an inlet, an outlet, and a central cavity for receiving a ball valve member. The ball valve member acts as a gate in the flow passage between the inlet and the outlet. In some instances, the ball valve member may be hemispheric in shape. In other instances, the ball valve member may have a hole that accepts and couples to a shaft that extends from opposite sides of the ball valve member along a line generally transverse to the flow passage. Thus, the ball valve member may be rotatably mounted in the central cavity of the valve body so that the ball valve member rotates between an open position where the flow passage is clear and a closed position where the flow passage is blocked. For a tight seal in a closed position, a surface of the ball valve member is positioned in tight contact with a corresponding inlet or outlet of the valve body.

SUMMARY

The present disclosure generally describes valve assemblies with a rotatable member having a seal ridge for improved valve life.

According to some examples, a valve assembly is described. The valve assembly may include a valve body having an inner wall, a first portion of the inner wall that defines a first port of the valve body, a second portion of the inner wall that defines a second port of the valve body, and a controllable flow path that extends along the inner wall between the first port and the second port of the valve body. The valve assembly may also include a first shaped gasket disposed about the first port of the valve body; and a rotatable member disposed in the controllable flow path of the valve body, where the rotatable member includes an outer surface portion with a seal ridge formed about a perimeter of the outer surface portion. The valve assembly may further include a shaft member coupled to the rotatable member, where the shaft member is configured to actuate a position of the rotatable member such that the seal ridge is selectively engaged with the first shaped gasket.

According to other examples, the valve assembly may further include a second shaped gasket disposed about the second port of the valve body, and the shaft member may be configured to actuate a position of the rotatable member such that the seal ridge is selectively engaged with either the first shaped gasket or the second shaped gasket. The first shaped gasket and the second shaped gasket may be configured to surround the rotatable member in a closed position. The first shaped gasket and the second shaped gasket may be substantially annular. Each of the first shaped gasket and the second shaped gasket may include a lip portion configured to engage at least the seal ridge. The lip portion may be spring-energized. The rotatable member may further include an inside surface portion and a tampered edge portion between the outer surface portion and the inside surface portion. The outer surface portion of the rotatable member may be substantially flat. The seal ridge may have a height in a range from 4 mm to 9 mm and a width in a range from 4 mm to 9 mm.

According to further examples, the first shaped gasket and the second shaped gasket may be composed of a material from a list comprising a metal, a plastic, a polymer, a rubberized material, or a composite. The rotatable member may be composed of a material from a list comprising a metal, a plastic, a polymer, or a composite. The seal ridge may be composed of a material from a list comprising a metal, a plastic, a polymer, a rubberized material, or a composite. The rotatable member may be coupled to the shaft member in an offset manner to facilitate a flow of a fluid or a gas between the first port and the second port in an open position of the rotatable member. The rotatable member may be shaped substantially as a hemisphere with the substantially flat surface portion, an inner surface portion, and a tampered edge portion. The shaft member may include a first portion coupled to an upper portion of the rotatable member and a second portion coupled to a lower portion of the rotatable member. The seal ridge may be configured to engage the first shaped gasket or the second shaped gasket at an incidence angle of about 16 degrees when the rotatable member is operationally closing.

According to some examples, rotatable member for a ball valve in a valve assembly with a shaft member and a flow path between a first port of the valve assembly with a first shaped gasket and a second port of the valve assembly is described. The rotatable member may include a body comprising a shaft coupler portion, a substantially flat surface portion, an inner surface portion, and a tampered edge portion therebetween; and a seal ridge formed about a perimeter of the substantially flat surface portion. The body may be configured to be disposed within the flow path between the first port and the second port of the valve assembly, and the shaft coupler portion of the body may be configured to be coupled to the shaft member of the valve assembly effective to actuate a position of the rotatable member such that the seal ridge is selectively engaged with the first shaped gasket at the first port of the valve assembly.

According to other examples, the seal ridge may be configured to contact a spring-energized lip portion of the first shaped gasket or the second shaped gasket of the valve assembly in a closed position of the rotatable member. The seal ridge may have a height in a range from 4 mm to 9 mm and a width in a range from 4 mm to 9 mm. The body may be composed of a material from a list comprising a metal, a plastic, a polymer, or a composite. The seal ridge may be composed of a material from a list comprising a metal, a plastic, a polymer, a rubberized material, or a composite. The body may be configured to be coupled to the shaft member of the valve assembly in a displaced manner effective to allow flow between the first port and the second port of the valve assembly in an open position of the rotatable member. An upper portion of the shaft coupler portion may be configured to be coupled to a first portion of the shaft member and a lower portion of the shaft coupler portion may be configured to be coupled to a second portion of the shaft member. The seal ridge may be configured to engage the first shaped gasket or the second shaped gasket of the valve assembly at an incidence angle of about 16 degrees when the rotatable member is closing.

According to some examples, a method to manufacture a valve apparatus is described. The method may include forming a valve body having an inner wall, a first portion of the inner wall, and a second portion of the inner wall, such that the first portion of the inner wall defines an inlet port of the valve body, a second portion of the inner wall defines an outlet port of the valve body, and the inner wall, the inlet port, and the outlet port define a controllable flow path that extends along the inner wall between the inlet port and the outlet port of the valve body. The method may also include disposing an inlet gasket about the inlet port of the valve body; disposing an outlet gasket about the outlet port of the valve body; forming a rotatable member to include a substantially flat surface portion, an inner surface portion, and a tampered edge portion therebetween; forming a seal ridge about a perimeter of the substantially flat surface portion of rotatable body; disposing the rotatable member in the controllable flow path of the valve body; forming a shaft member to include a first portion and a second portion, where the shaft member is effective to actuate a position of the rotatable member such that the seal ridge is selectively engaged with either the inlet gasket or the outlet gasket; and coupling the shaft member to the rotatable member by coupling the first portion of the shaft member to an upper portion of the rotatable body and the second portion of the shaft member to a lower portion of the rotatable body in an offset manner.

According to other examples, the method may further include forming the inlet gasket and the outlet gasket substantially annular-shaped and such that the inlet gasket and the outlet gasket are effective to surround at least the tampered edge portion of the rotatable body in a closed position of the rotatable member. Forming the inlet gasket and the outlet gasket may include forming a lip portion about each of the inlet gasket and the outlet gasket effective to engage at least the seal ridge during a closing of the rotatable member. Forming the lip portion may include forming the lip portion to be spring-energized. Forming the rotatable body may include forming the rotatable body with a material from a list comprising a metal, a plastic, a polymer, or a composite.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates an exploded section view of a rotatable member having a seal ridge in a minimum contact position with a gasket of a valve assembly;

Figure 1A:
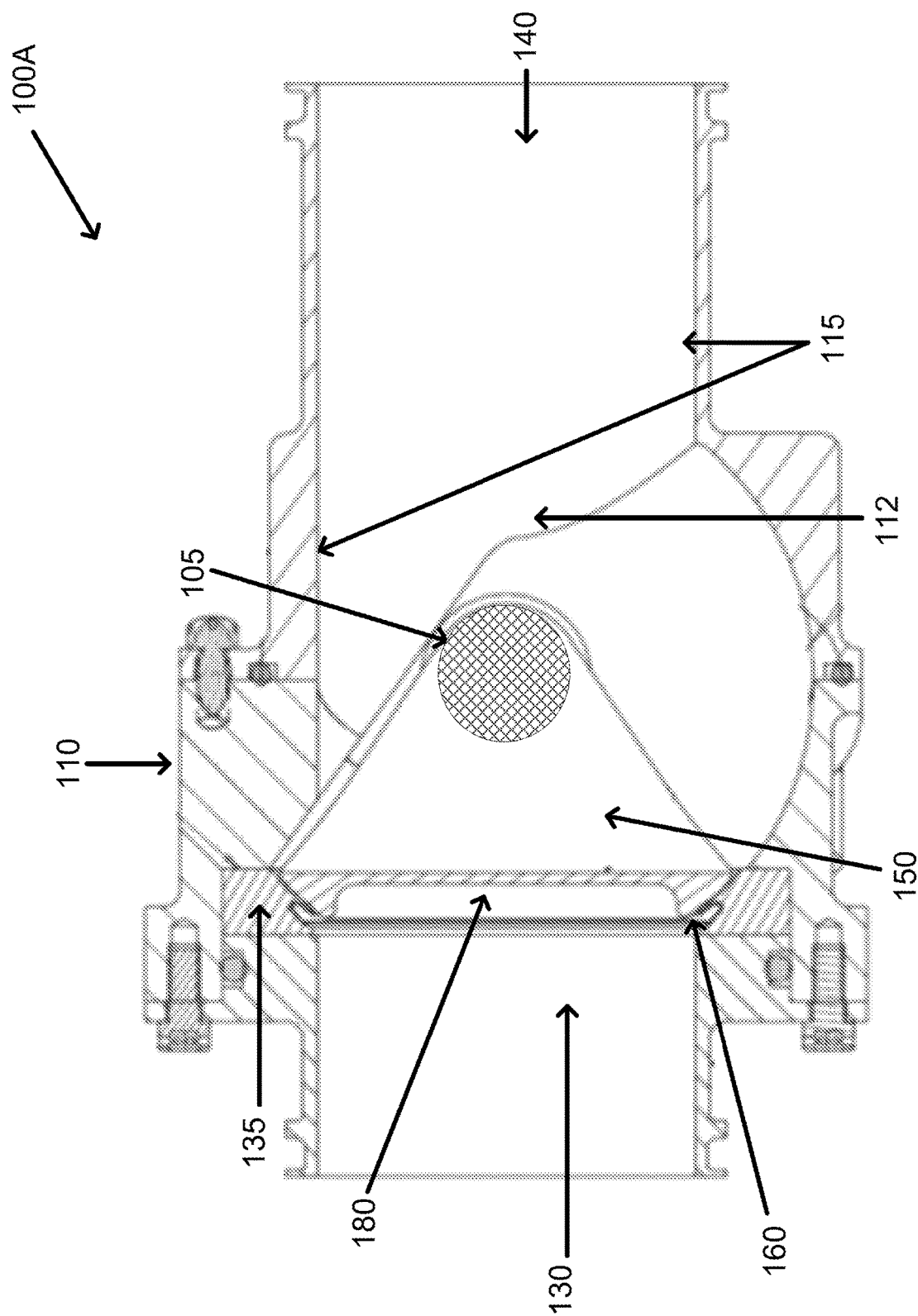
FIG. 1A illustrates a top cross-sectional view of an example valve assembly with a rotatable member having a seal ridge.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems and/or devices associated with valve assemblies with a rotatable member having a seal ridge for improved valve life.

Briefly stated, technologies are generally described for valve assemblies that include a valve body whose inner wall defines two ports and a controllable flow path that extends along the inner wall between the two ports of the valve body. Each port may be fitted with a corresponding gasket. A rotatable member disposed in the controllable flow path of the valve body may include a hemispherical-shaped body with a substantially flat disk-shaped surface portion, and a seal ridge formed about a perimeter of the substantially flat disk-shaped surface portion. During opening and closing operation, the seal ridge may be selectively engaged with either one of the gaskets during closing operation reducing an initial contact surface, and thereby reducing friction between the rotatable member and the gaskets.

Disclosed herein are valve assemblies with rotatable members that include a seal ridge on a substantially flat contact surface. A hemispherical-shaped body of the rotatable member with a substantially flat surface portion and a seal ridge formed about a perimeter of the substantially flat surface portion may improve operational life of a valve assembly by reducing the seal contact area. Other areas of the rotatable member that are surrounded by a gasket of the valve body may be out of contact with the gasket during a transition from a closed position to an open position or vice versa with the exception of two areas of contact at any given position. The contact provided by the seal ridge at two areas of contact during transitional operation, rather than a linear contact region as is found in conventional valve assemblies, may result in longer valve assembly life with reduced friction and reduced torque required during opening and closing operations. The rotatable member having a hollowed out partial sphere (or hemisphere) shape with a first side with a flat portion abutted by two curved portions may reduce a mass of the rotatable member, and thereby the valve assembly.

The operational life of a valve assembly may be on the order of 50,000 to 100,000 cycles of operation. Friction created during the opening and closing operation may degrade the ball valve member, the inlet, or the outlet, which require replacement of ball valve members and/or various seals at the inlets and outlets of the valve body.

FIG. 1A illustrates a top cross-sectional view of an example valve assembly with a rotatable member having a seal ridge, arranged in accordance with at least some embodiments described herein.

As illustrated in FIG. 1A, an example valve assembly 100A may include a valve body 110 having an inner wall 115, a first portion of the inner wall 115 that defines a first port 130 of the valve body 110, a second portion of the inner wall that defines a second port 140 of the valve body 110, and a controllable flow path 112 that extends along the inner wall between the first port 130 and the second port 140 of the valve body 110. The valve assembly 100A may also include a first shaped gasket 135 disposed about the first port 130 of the valve body 110, and a rotatable member 150 disposed in the controllable flow path 112 of the valve body 110, where the rotatable member 150 includes a substantially flat surface portion 180 with a seal ridge 160 formed about a perimeter of the substantially flat surface portion 180. The valve assembly 100A may further include a shaft member 105 coupled to the rotatable member 150.

In some examples, the rotatable member 150 may have a partial or hemispherical shape. For example, the hemispherical shape of the rotatable member 150 may be formed as a half of a sphere. In various examples, the hemispherical shape of the rotatable member 150 may be formed as a half of a sphere with a center portion hollowed out on one side of the sphere. In still further examples, an upper portion of the of the rotatable member 150 may be coupled to a first portion of the shaft member 105 in an offset manner. Similarly, a lower portion of the rotatable member 150 may be coupled to a second portion of the shaft member 105 in an offset manner. The shape of the rotatable member 150 and the offset position of the coupling to the shaft member 105 may facilitate improved volume of flow for fluids or gases through the controllable flow path 112.

A substantially flat surface portion 180 of the rotatable member 150 may be adapted to seal the first port 130 in a closed position of the valve assembly 100A. For example, the substantially flat surface portion 180 may be positioned to engage first shaped gasket 135 to affect a seal or block to the port. The seal ridge 160 formed about the perimeter of the substantially flat surface portion 180 may engage a contact surface of either the first shaped gasket 135 (for example, a lip portion) and provide reduced friction by decreasing an engagement area between the rotatable member and the gaskets during a closing operation. The reduced friction during actuation of the rotatable member may result in decreased wear of the rotatable member and corresponding gaskets. In operation, the shaft member 105 may actuate a position of the rotatable member 150 such that the seal ridge 160 is selectively engaged with one of the first shaped gasket 135.

Figure 1B:
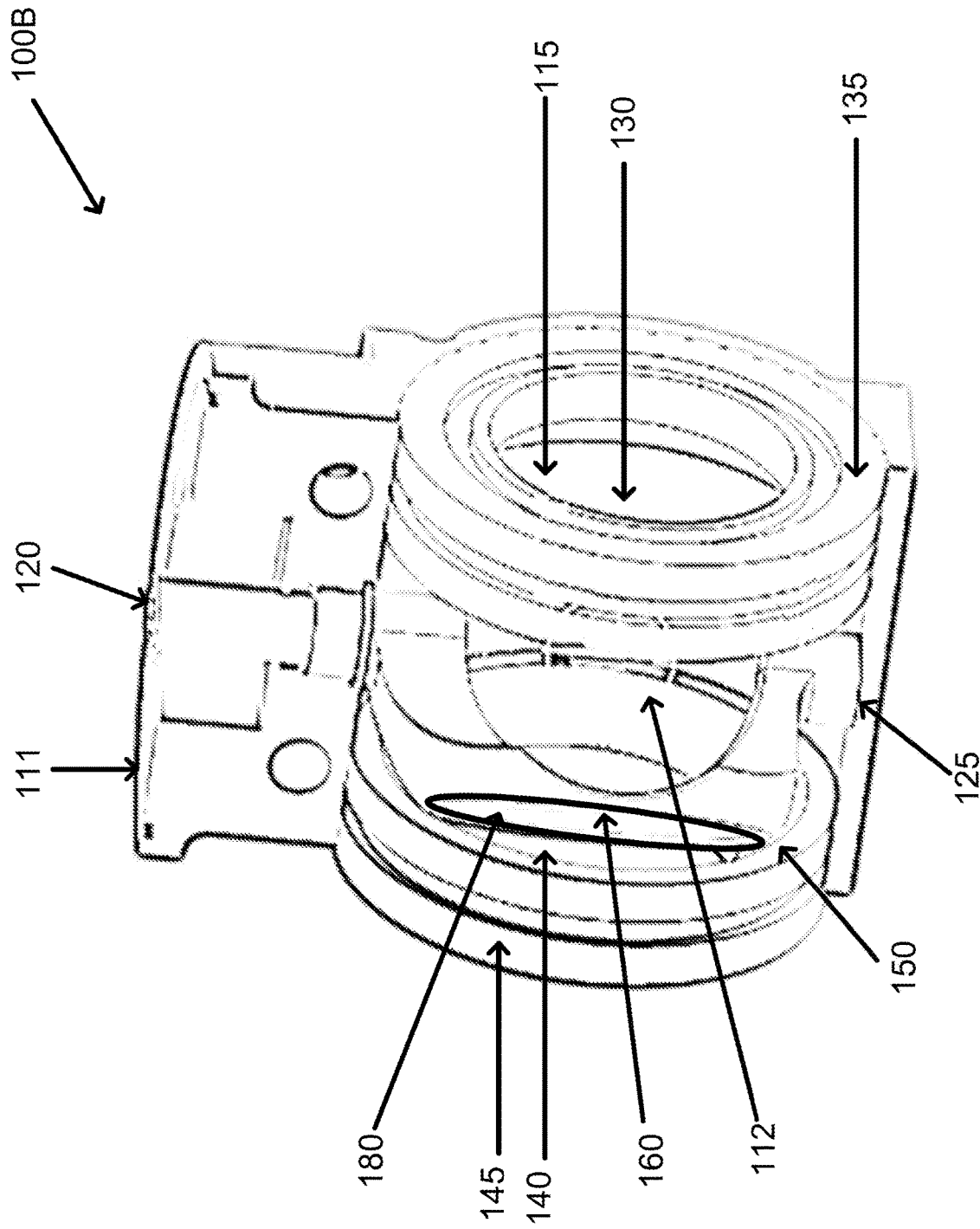
FIG. 1B illustrates a cutaway view of another example valve assembly with a rotatable member having a seal ridge.

FIG. 1B illustrates a cutaway view of another example valve assembly with a rotatable member having a seal ridge, arranged in accordance with at least some embodiments described herein.

FIG. 1B shows an example valve assembly 100B, where the rotatable member 150 may be configured to selectively engage a first shaped gasket 135 and the second shaped gasket 145 in alternating closed positions. Valve assembly 100B includes similar parts and configurations as the example valve assembly 100A of FIG. 1A. Because of the different configuration, valve body is indicated with reference numeral 111 in FIG. 1B. The valve assembly 100B includes a second shaped gasket 145 disposed about a second port 145 of the valve body 111, where the second port 140 is defined by a second portion of the inner wall 115 of the valve body 111. The rotatable member 150 is disposed in the controllable flow path 112 of the valve body 111. The substantially flat surface portion 180 of the rotatable member 150 is shown in FIG. 1B in a semi-closed position indicating visually how the seal ridge 160 lines up with a perimeter of the second shaped gasket 145 before completely closing.

The first shaped gasket 135 and the second shaped gasket 145 may be annular-shaped. A cross-section of the annular shape may be substantially circular, elliptical, or similar shapes including irregular. For a tight seal with the rotatable member, the cross-section shape and size of the shaped gaskets may match those of the rotatable member 150, specifically, portions of the rotatable body surrounded by the shaped gaskets. The valve body 111 (or the valve body 110 shown in FIG. 1A) of the valve assembly may be composed of a material from a list comprising a metal, a plastic, a polymer, or a composite. The first shaped gasket and the second shaped gasket may be composed of a material from a list comprising a metal, a plastic, a polymer, a rubberized material, or a composite.

The valve assemblies shown in FIG. 1A and FIG. 1B may be used in fluid, gas, or similar flow applications and may include other components such as other ridges, mounting flanges or bases, mounting struts, seal rings, etc. Shapes and configurations of the shown (and not shown) components may be varied depending on implementation and materials without departing from the principles described herein.

Figure 2A:
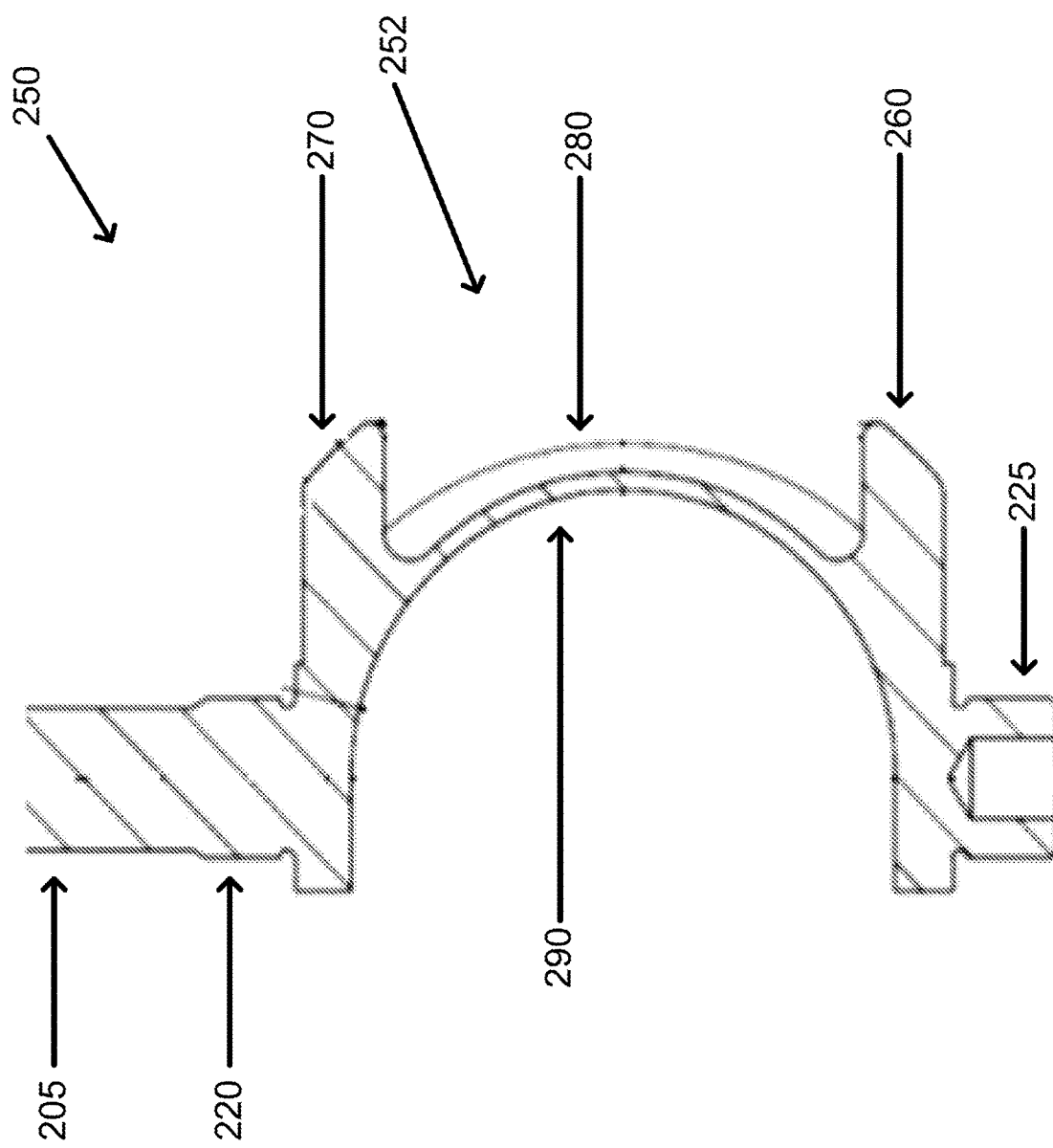
FIG. 2A illustrates a side cross-sectional view of a rotatable member having a seal ridge.

FIG. 2A illustrates a side cross-sectional view of a rotatable member having a seal ridge, arranged in accordance with at least some embodiments described herein.

As discussed in conjunction with FIGS. 1A and 1B, the rotatable member 250 in FIG. 2A may have a partial-sphere or hemisphere shape, that is, the rotatable member 250 may be formed as if it has been cut from a ball with a center portion hollowed out. A flat surface portion and an abutting tampered edge portion together may be substantially disk-shaped and may fit into a shaped gasket of the valve assembly in a closed position. An upper portion of the of the rotatable member 250 may be coupled to a first portion 220 of the shaft member 205, and a lower portion of the rotatable member 250 may be coupled to a second portion 225 of the shaft member 205 in an offset manner. The shape and offset coupling of the rotatable member 250 may facilitate improved volume of flow for fluids or gases through a controllable flow path of the valve assembly.

A "body" 252 of the rotatable member 250 may be defined as a portion of the rotatable member 250 between the first portion 220 of the shaft member and the second portion 225 of the shaft member. The body 252 may include an outer surface portion 280, an inner surface portion 290, and a tampered edge portion 270 therebetween. The outer surface portion 280 and the abutting tampered edge portion 270 together may form a disk-like shape. The body 252 may also include a seal ridge 260 formed about a perimeter of the substantially flat surface portion 180. The seal ridge 260 may have a curved cross-shape, that is, a cross-section of the seal ridge 260 may be a partial circle, ellipse, or similar curve. The rotatable member 250 may be composed of a material from a list comprising a metal, a plastic, a polymer, or a composite. The seal ridge 260 may be composed of a material from a list comprising a metal, a plastic, a polymer, a rubberized material, or a composite.

Figure 2B:
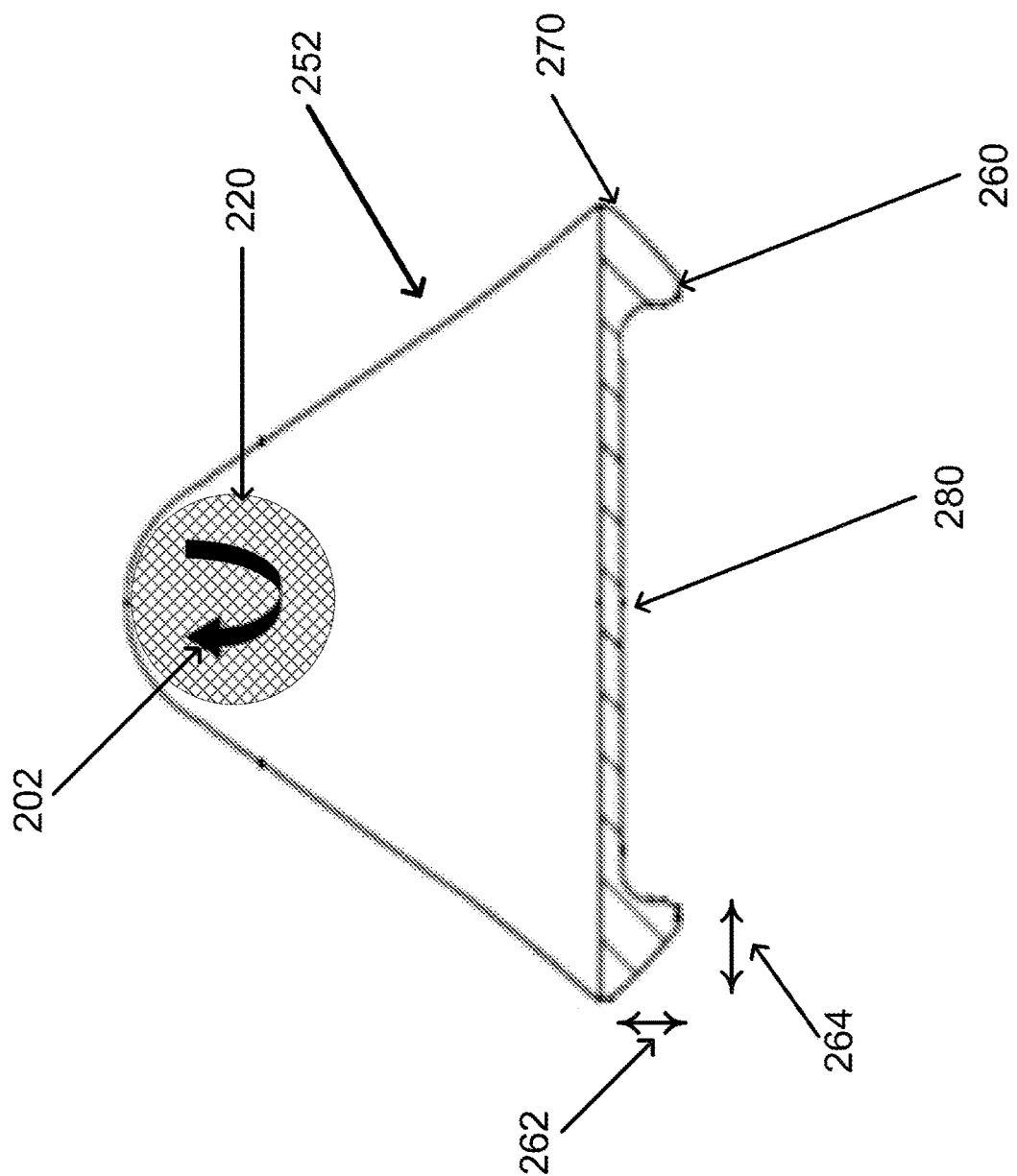
FIG. 2B illustrates a top cross-sectional view of a rotatable member having a seal ridge.

FIG. 2B illustrates a top cross-sectional view of a rotatable member having a seal ridge, arranged in accordance with at least some embodiments described herein.

As shown FIG. 2B, a body 252 of a rotatable member of a valve assembly according to some examples may include a substantially flat surface portion 280 and an adjoining tampered edge portion 270, where an upper portion of the of the body 252 is coupled to a first portion 220 of a shaft member of the valve assembly. Similarly, a lower portion (not shown) of the body 252 may be coupled to a second portion of the shaft member of the valve assembly in an offset manner. The body 252 of the rotatable member may also include a seal ridge 260, which may be formed about a perimeter of the substantially flat surface portion 280. The seal ridge 260 may have a curved cross-shape. In some examples, the seal ridge may have a height in a range from 4 mm to 9 mm and a width in a range from 4 mm to 9 mm.

In other examples, a substantially annular-shaped gasket (an inlet gasket or an outlet gasket of the valve assembly) may be configured to surround at least a portion of the tampered edge portion 270 and the seal ridge 260 of the rotatable member in a closed position of the valve assembly. The rotatable body may be configured to open and close one port (e.g., inlet port or outlet port) of the valve assembly as shown in FIG. 1A. Alternatively, the rotatable body may be configured to open and close either one of the ports of the valve assembly, that is, the rotatable body may close either port by engaging a corresponding gasket of the inlet port or the outlet port as shown in FIG. 1B. The gasket may include a lip portion configured to engage at least the seal ridge 260 during a closing operation of the rotatable member. The lip portion may be spring-energized. The seal ridge 260, by engaging the lip portion first (and last) during a closing operation (and opening operation), may allow reduction of friction between the gasket and the rotatable member, and thereby, reduce a wear of the valve assembly components extending an operational life of the valve assembly.

Figure 2C:
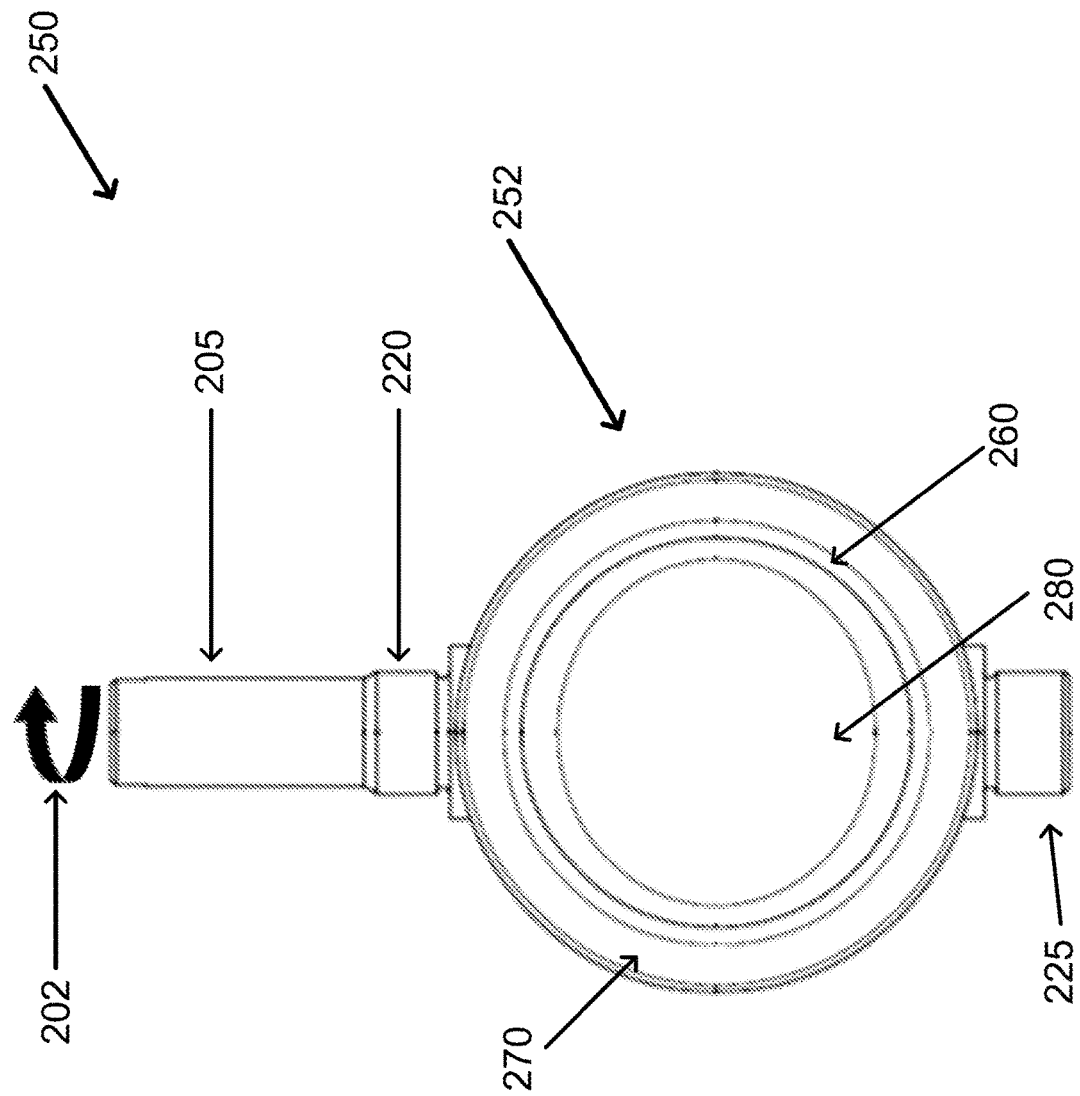
FIG. 2C illustrates a two-dimensional front view of a rotatable member having a seal ridge.

FIG. 2C illustrates a two-dimensional front view of a rotatable member having a seal ridge, arranged in accordance with at least some embodiments described herein.

As shown in FIG. 2C, a rotatable member 250 of a valve assembly may include a body 252 coupled to a shaft member 205 of the valve assembly through an upper portion 220 and a lower portion 225 of the shaft member 205. The shaft member 205 may be rotated affecting a closing or an opening operation by the rotatable member 250 within the valve assembly. The front view of the body 252 of the rotatable member 250 may include the outer surface 280, which may be substantially flat in some examples, a tampered edge portion 270, and a seal ridge 260. As discussed above, the seal ridge 260, may engage a lip portion of a gasket of the valve assembly first (and last) during a closing operation (and opening operation) and allow reduction of friction between the gasket and the rotatable member.

Figure 3:
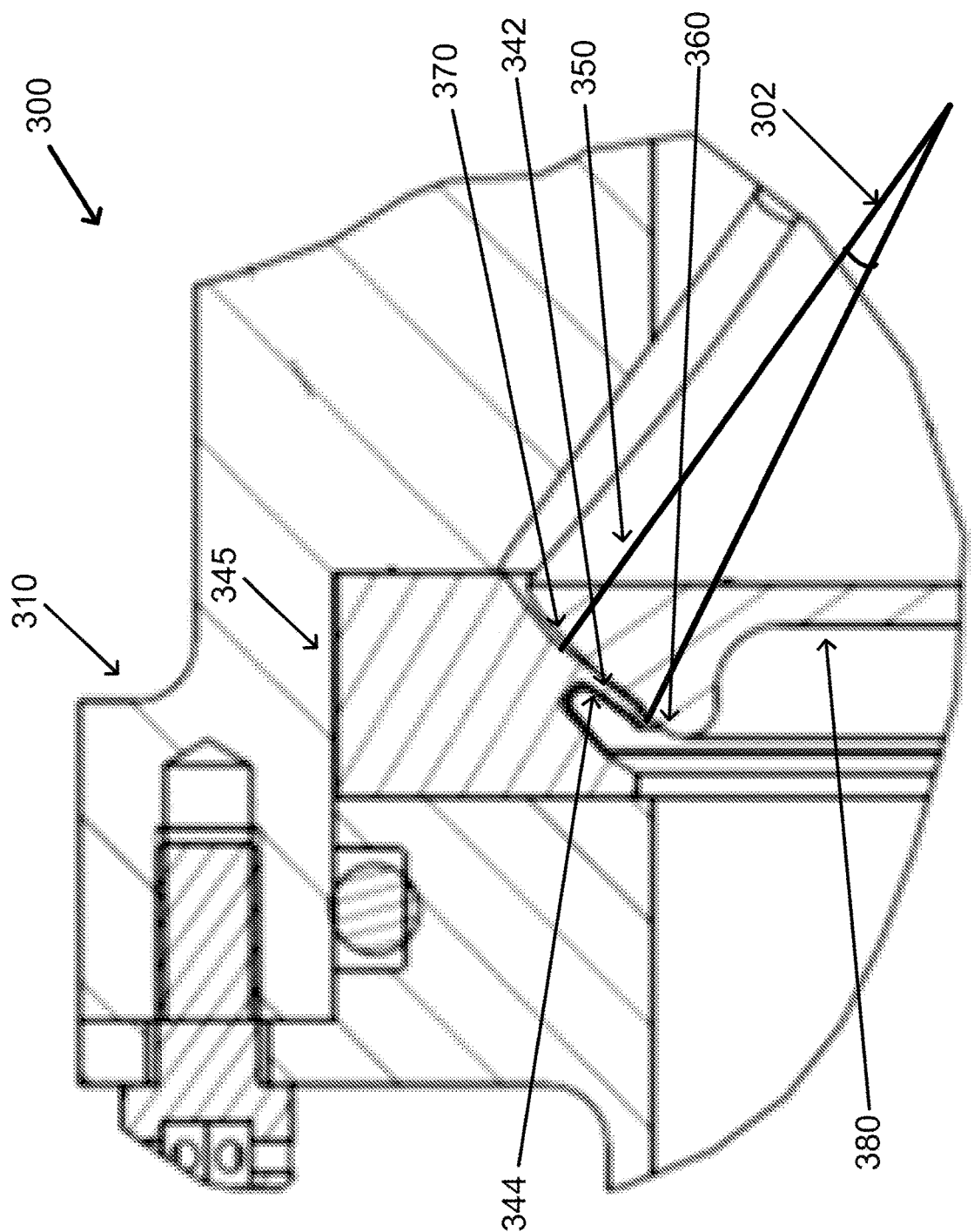
FIG. 3 illustrates an exploded section view of a rotatable member having a seal ridge in contact with a gasket of a valve assembly in a closed position.

FIG. 3 illustrates an exploded section view of a rotatable member having a seal ridge in contact with a gasket of a valve assembly in a closed position, arranged in accordance with at least some embodiments described herein.

The section view in diagram 300 of FIG. 3 includes a body 310 of the valve assembly, a portion of a gasket 345 and a portion of a rotatable member 350 of a valve assembly in closed position. The gasket 345 includes a lip portion 342, which in some examples may be energized by a spring 344. The rotatable member 350 includes a substantially flat surface portion 380, a seal ridge 360 formed about a perimeter of the substantially flat surface portion 380, and a tampered edge portion 370. A sealing surface of the rotatable member 350 defined by angle 302 may be surrounded by the lip portion 342 and remaining inside surfaces of the gasket 345 in the closed position.

Whereas conventional ball valves have a line or surface contact with a gasket during closing operation, in a valve assembly according to some examples, the seal ridge 360 may engage the lip portion 342 in two contact areas as the rotatable member closes as opposed to linear contact in conventional ball valve assemblies. Thus, the lip portion 342 may be pushed away from the surface of the rotatable member 350 during a closing operation resulting in reduced friction on the surfaces of the gasket and the rotatable member 350, and thereby, reducing wear and tear on the components of the valve assembly. Furthermore, the reduced friction may also result in reduced torque need for the closing (and opening) operations of the rotatable member 350.

FIG. 4 illustrates an exploded section view of a rotatable member having a seal ridge in a minimum contact position with a gasket of a valve assembly, arranged in accordance with at least some embodiments described herein.

The section view in diagram 400 of FIG. 4 includes a gasket 445 and a rotatable member 450 of a valve assembly as the rotatable member 450 transitions from a closed position to an open position. The gasket 445 may be formed about a port 440 of the valve assembly and include a lip portion 442, which in some examples may be energized by a spring 440. While a cross-section of the gasket 445 and rotatable member 450 are shown in diagram 400, the gasket 445 may be substantially annular-shaped. The gasket 445 may also include a number of ridges, grooves, and other elements depending on implementation specifics.

The rotatable member 450 includes a substantially flat surface portion 480, a seal ridge 460 formed about a perimeter of the substantially flat surface portion 480, and a tampered edge portion 470. During transition from the closed position to the open position (or vice versa), minimum contact between the gasket 445 and the rotatable member 450 may be achieved at an angle 404 of about 16 degrees. Thus, a valve assembly according to some examples may provide a smaller angle to break seal (transition from closed position to open position) compared to conventional ball valve systems, which may have an angle of 45 degrees or higher to break seal.

During transition from the closed position to the open position (or vice versa), past the minimum contact point between the gasket 445 and the rotatable member 450 (about 16 degree angle), spacing between the seal ridge 460/ tampered edge portion 470 and the lip portion 442 of the gasket 445 may increase allowing fluids or gases to flow through between the ports of the valve assembly. As the rotatable member 450 reaches a complete open position (about 90 degrees to a plane of the gasket 445), full flow may be achieved. Due to the hollowed-out, substantially hemisphere-shape of the rotatable member 450, improved flow may be attained compared to conventional sizes and shapes of ball valves, where a shape of the rotatable member may obstruct the flow path of the valve assembly.

The benefits of the presently disclosed valve assembly devices are numerous. For example, the valve assemblies disclosed herein may enable longer valve assembly life and lower torque required during opening and closing operations through the engagement of the seal ridge by the gasket (lip portion thereof) and resulting lesser initial contact area. Example valve assemblies may also have reduced mass of the rotatable member and improved flow through the hollowed out, partial sphere shape.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to manufacture a valve apparatus comprising:
   forming a valve body having an inner wall, a first portion of the inner wall, and a second portion of the inner wall, such that
   the first portion of the inner wall defines an inlet port of the valve body,
   a second portion of the inner wall defines an outlet port of the valve body, and
   the inner wall, the inlet port, and the outlet port define a controllable flow path that extends along the inner wall between the inlet port and the outlet port of the valve body;
   disposing an inlet gasket about the inlet port of the valve body, wherein the inlet gasket comprises a lip portion protruding from an inside surface of the inlet gasket;
   disposing an outlet gasket about the outlet port of the valve body, wherein the outlet gasket comprises another lip portion protruding from an inside surface of the outlet gasket;
   forming a rotatable member to include a substantially flat surface portion, an inner surface portion, and a tampered edge portion therebetween;

forming a seal ridge about a perimeter of the substantially flat surface portion of rotatable body such that the seal ridge contacts only the lip portion of the inlet gasket or the other lip portion of the outlet gasket during a transitional operation rather than an entire side surface of the seal ridge contacting the entire inside surfaces of the inlet gasket or the outlet gasket, thereby reducing friction between the seal ridge and the inlet gasket and the outlet gasket;

disposing the rotatable member in the controllable flow path of the valve body;

forming a shaft member to include a first portion and a second portion, wherein the shaft member is effective to actuate a position of the rotatable member such that the seal ridge is selectively engaged with either the inlet gasket or the outlet gasket; and coupling the shaft member to the rotatable member by coupling the first portion of the shaft member to an upper portion of the rotatable body and the second portion of the shaft member to a lower portion of the rotatable body in an offset manner.

2. The method of claim 1, further comprising:

forming the inlet gasket and the outlet gasket substantially annular-shaped and such that the inlet gasket and the outlet gasket are effective to surround at least the tampered edge portion of the rotatable body in a closed position of the rotatable member.

3. The method of claim 1, wherein the lip portion and the other lip portion are spring-energized.

4. The method of claim 1, wherein forming the rotatable body comprises:

forming the rotatable body with a material from a list comprising a metal, a plastic, a polymer, or a composite.

5. A valve assembly comprising:

a valve body having an inner wall, a first portion of the inner wall, and a second portion of the inner wall, wherein
the first portion of the inner wall defines a first port of the valve body,
a second portion of the inner wall defines a second port of the valve body, and
the inner wall, the first port, and the second port define a controllable flow path that extends along the inner wall between the first port and the second port of the valve body;

a first shaped gasket disposed about the first port of the valve body and comprising a lip portion protruding from an inside surface of the first shaped gasket;

a rotatable member disposed in the controllable flow path of the valve body, wherein the rotatable member includes an outer surface portion with a seal ridge formed about a perimeter of the outer surface portion such that the seal ridge contacts only the lip portion of the first shaped gasket during a transitional operation rather than an entire side surface of the seal ridge contacting the entire inside surface of the first shaped gasket, thereby reducing friction between the seal ridge and the first shaped gasket; and a shaft member coupled to the rotatable member, wherein the shaft member is configured to actuate a position of the rotatable member such that the seal ridge is selectively engaged with the first shaped gasket.

6. The valve assembly of claim 5, further comprising:

a second shaped gasket disposed about the second port of the valve body and comprising another lip portion, wherein the shaft member is further configured to actuate a position of the rotatable member such that the seal ridge is selectively engaged with either the first shaped gasket or the second shaped gasket.

7. The valve assembly of claim 6, wherein the first shaped gasket and the second shaped gasket are substantially annular and configured to surround the rotatable member in a closed position.

8. The valve assembly of claim 6, wherein the lip portion and the other lip portion are spring-energized to engage at least the seal ridge.

9. The valve assembly of claim 5, wherein the rotatable member further includes an inside surface portion and a tampered edge portion between the outer surface portion and the inside surface portion.

10. The valve assembly of claim 5, wherein the outer surface portion of the rotatable member is substantially flat.

11. The valve assembly of claim 5, wherein
the seal ridge has a height in a range from 4 mm to 9 mm; and
the seal ridge has a width in a range from 4 mm to 9 mm.

12. The valve assembly of claim 5, wherein
the first shaped gasket is composed of a material from a list comprising a metal, a plastic, a polymer, a rubberized material, or a composite;
the rotatable member is composed of a material from a list comprising a metal, a plastic, a polymer, or a composite; and
the seal ridge is composed of a material from a list comprising a metal, a plastic, a polymer, a rubberized material, or a composite.

13. The valve assembly of claim 5, wherein the rotatable member is coupled to the shaft member in an offset manner to facilitate a flow of a fluid or a gas between the first port and the second port in an open position of the rotatable member.

14. The valve assembly of claim 5, wherein the seal ridge is configured to engage the lip portion of the first shaped gasket at an incidence angle of about 16 degrees when the rotatable member is operationally closing.

* * * * *